United States Patent [19]

Ansart et al.

[11] Patent Number: 5,285,630
[45] Date of Patent: Feb. 15, 1994

[54] SYSTEM FOR REDUCING NITROGEN-OXIDE EMISSIONS FROM A GAS TURBINE ENGINE

[75] Inventors: Denis R. H. Ansart, Bois le Roi; Gérard J. P. Bayle Laboure, Avon; Jacques L. M. Maunand, Saint Forget; Denis J. M. Sandelis, Nangis, all of France

[73] Assignee: Societe Nationale d'Etude et de Construction de Moteurs d'Aviation S.N.E.C.M.A., Paris, France

[21] Appl. No.: 978,819

[22] Filed: Nov. 19, 1992

[30] Foreign Application Priority Data

Nov. 20, 1991 [FR] France .................. 91 14291

[51] Int. Cl.⁵ .................................. F02C 9/16
[52] U.S. Cl. ...................... 60/39.23; 60/39.27; 60/39.36
[58] Field of Search ........... 60/39.23, 39.27, 39.29, 60/746, 747, 39.36

[56] References Cited

U.S. PATENT DOCUMENTS 2,770,096 11/1956 Fox ........................ 60/39.23
3,705,492 12/1972 Vickers .
3,842,597 10/1974 Ehrich .
3,952,501 4/1976 Saintsbury .
4,138,842 2/1979 Zwick ..................... 60/39.23
4,255,927 3/1981 Johnson et al. ............ 60/39.23

FOREIGN PATENT DOCUMENTS 0401529 12/1990 European Pat. Off. .
1008197 2/1952 France .
2039359 8/1980 United Kingdom .

Primary Examiner—Louis J. Casaregola
Attorney, Agent, or Firm—Bacon & Thomas

[57] ABSTRACT

A system for reducing nitrogen oxide emissions from a gas turbine engine is disclosed in which a portion of air in the air compressor is tapped and supplied to an inlet which introduces at least a portion of the tapped air into the primary zone of the combustion chamber. A control device is disposed between the tap and the inlet to control the air flow passing to the inlet. The inlet is located so as to inject the tapped air into the combustion chamber primary zone at the intersection of adjacent fuel sprays. The control device, which may be an adjustable flap valve or a three-way valve, may also be operatively connected to the throttle control for the gas turbine engine such that the control allows the maximum amount of air to pass into the combustion chamber under full power conditions. The control device is preferably mounted outside the engine casing enclosing the combustion chamber to allow easy access for assembly and maintenance.

7 Claims, 3 Drawing Sheets

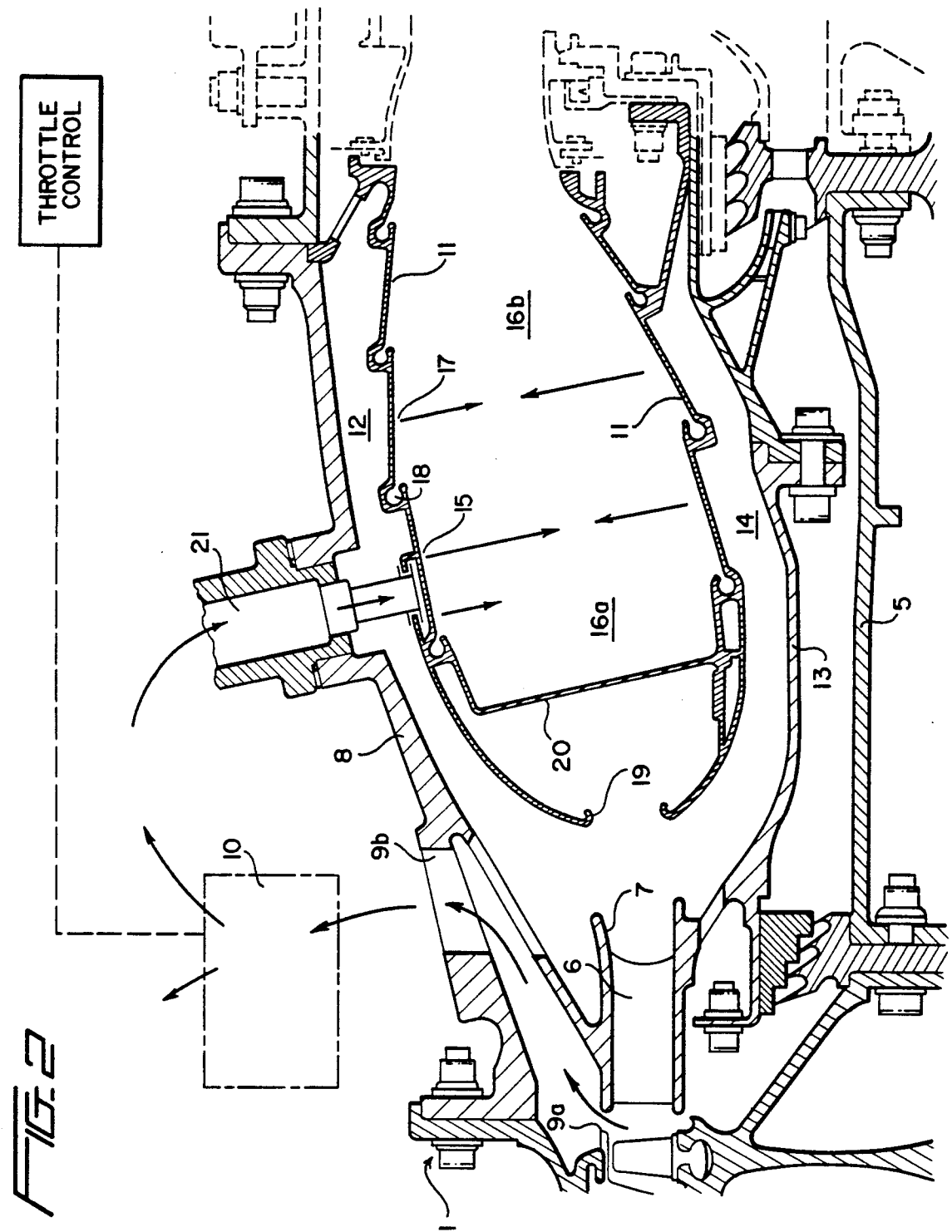

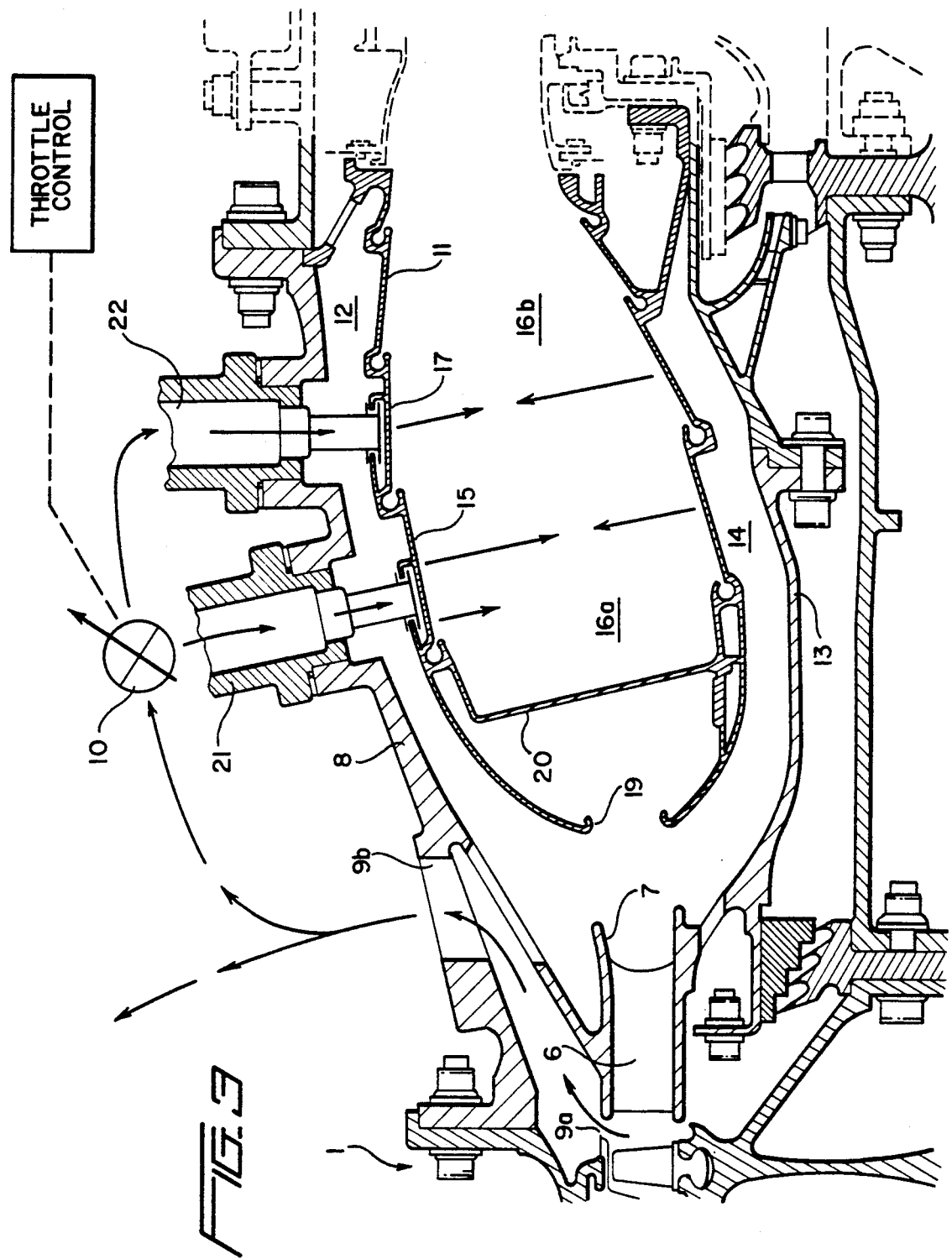

SYSTEM FOR REDUCING NITROGEN-OXIDE EMISSIONS FROM A GAS TURBINE ENGINE

BACKGROUND OF THE INVENTION

The present invention relates to a gas turbine engine, such as those utilized for aircraft applications, which has a system to substantially reduce the formation and emission of nitrogen oxides.

International standards regarding emissions from gas turbine engines, particularly those in aircraft applications, are becoming more stringent, particularly regarding the levels of nitrogen oxides. It is well known that a maximum of nitrogen oxides will be formed in the combustion chamber of a gas turbine engine when the fuel/air mixture in the primary zone of the combustion chamber is near its stoichiometric ratio. At high power operating conditions, such as under full power, the gas temperatures are approximately 2,000° C.

Several proposals have been made in order to reduce the levels of nitrogen oxide emissions from gas turbine engines. U.S. Pat. No. 3,842,597 there to discloses the concept of introducing cooled air into the primary zone for the purpose of lowering the temperature of the combustion gases. The air is introduced through the air swirler enclosing the fuel injector. This system requires components which tap a portion of the air from the gas turbine air compressor, a heat exchanger to cool the tapped air using air from a secondary duct, and means to introduce the flow of tapped and cooled air into the primary zone of the combustion chamber. Such an apparatus is inherently bulky and heavy, thereby increasing the complexity and weight of the gas turbine engine. Also, excessively fuel-rich zones located at the intersection of adjacent fuel injection sprays still produce nitrogen oxide emissions. U.S. Pat. No. 3,705,492 illustrates a gas turbine engine wherein the gases from the turbine pass through a heat exchanger to heat air introduced into the dilution zone of the combustion chamber while the primary air entering through the injector swirlers is unheated in order to reduce the nitrogen oxide emissions. Again, this apparatus requires a heat exchanger and suffers from the weight and complexity penalties imposed by the other known systems.

SUMMARY OF THE INVENTION

A system for reducing nitrogen oxide emissions from a gas turbine engine is disclosed in which a portion of air in the air compressor is tapped and supplied to an inlet which introduces at least a portion of the tapped air into the primary zone of the combustion chamber. A control device is disposed between the tap and the inlet to control the air flow passing to the inlet. The inlet is located so as to inject the tapped air into the combustion chamber primary zone at the intersection of adjacent fuel sprays.

The control device, which may be an adjustable flap valve or a three-way valve, may also be operatively connected to the throttle control for the gas turbine engine such that the control allows the maximum amount of air to pass into the combustion chamber under full power conditions. The control device is preferably mounted outside the engine casing enclosing the combustion chamber to allow easy access for assembly and maintenance.

The three-way valve may also direct a portion of the tapped air into another inlet which allows the air to pass into the dilution zone of the combustion chamber.

BRIEF DESCRIPTION OF THE DRAWINGS

FIG. 2 is a partial, longitudinal, cross-sectional view of a gas turbine engine combustion chamber incorporating a first embodiment of the system according to the present invention.

FIG. 3 is a view similar to FIG. 2 illustrating a second embodiment of the system according to the present invention.

DETAILED DESCRIPTION OF THE PREFERRED EMBODIMENTS

Figure 1:
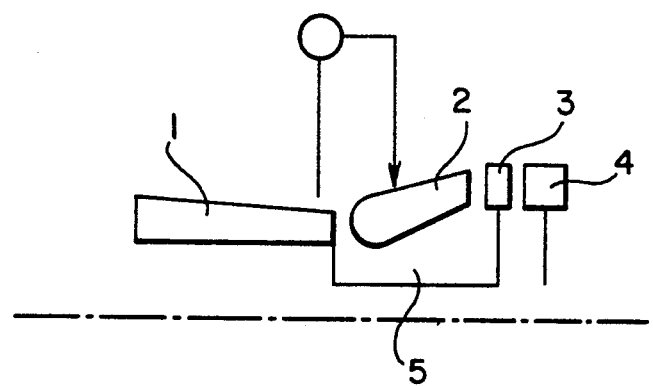
FIG. 1 is a diagrammatical representation of a gas turbine engine having the emissions reducing system according to the present invention.

FIG. 1 schematically illustrates a gas turbine engine incorporating the reduced nitrogen oxide emission systems according to the present invention. As can be seen, the gas turbine comprises an air compressor 1, which directs compressed air into a combustion chamber 2 in which the compressed air is mixed with fuel and burned. High temperature gases emanating from the combustion chamber 2 pass through turbine stages 3 and 4 before exiting the engine. Turbine 3 may be connected to the air compressor 1 through a central shaft 5 so as to drive the air compressor.

The air compressor 1 delivers pressurized air through a circular array of equidistantly spaced outlet guide vanes 6 which extend generally radially between the walls of the diffuser 7, as illustrated in FIGS. 2 and 3. A portion of the air pressurized by the compressor 3 is tapped upstream of the diffuser 7 through orifices 9a and 9b to enable the tapped air to pass through the external casing 8 which encloses the combustion chamber. The tapped air passes through control means 10, which may comprise a flap-valve or a three-way valve and which is located external to the casing 8.

The combustion chamber 2 is bounded by walls 11 and may assume a generally annular configuration within the external casing 8. The external casing 8 is spaced from combustion chamber wall 11 so as to define a first duct 12 therebetween, while the combustion chamber wall 11 located on the radially innermost side of the combustion chamber is spaced from an internal casing 13 so as to define therebetween a second duct 14. The ducts 12 and 14 guide the air delivered by the compressor through suitable apertures 15 defined by the combustion chamber walls 11 into the primary zone 16a of the combustion chamber 2 and through apertures 17, also defined by the combustion chamber walls 11, into a dilution zone 16b. Air introduced into the dilution zone 16b, in known fashion, dilutes the combustion gases formed in the primary zone 16a. Ducts 12 and 14 also supply air through vents 18 to cool the inner sides of combustion chamber walls 11, in known fashion.

The upstream end of the combustion chamber walls (toward the left as illustrated in FIGS. 2 and 3) divides the air flow delivered by the compressor 1 between the ducts 12 and 14, as well as upstream aperture 19. A circular array of fuel injectors (not shown) extend through upstream combustion chamber wall 20 to inject fuel into the primary zone 16a of the combustion chamber. The fuel injectors are typically arranged in a circular array around the longitudinal axis of the gas turbine engine.

Figure 4:
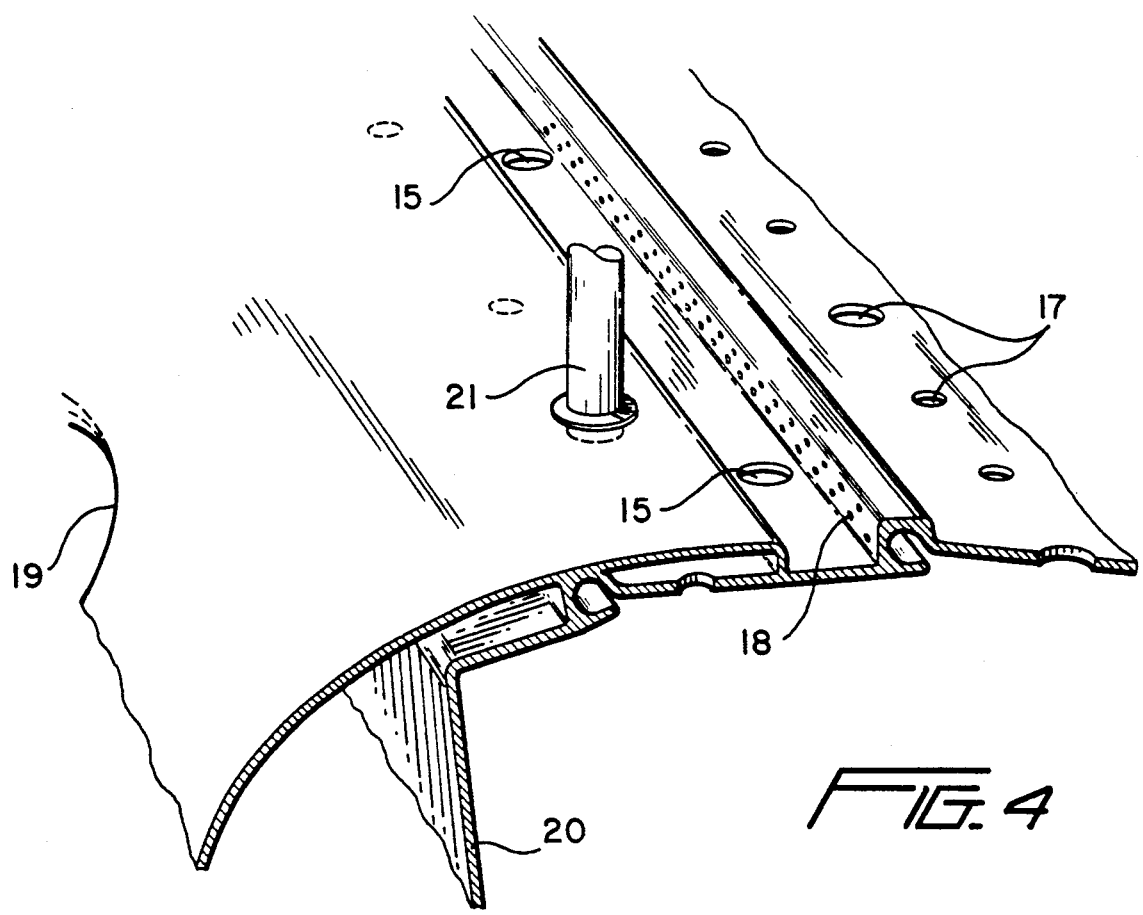
FIG. 4 is a partial, perspective view of the combustion chamber wall incorporating the system according to the present invention.

In the system according to the invention, inlet tubing 21 passes through the external casing 8 so as to direct air into the primary zone 16a of the combustion chamber. The inlet tubing 21 is connected to the control valve 10 and circumferentially located such that the air from the inlet tubings 21 enters the primary zone of the combustion chamber 16a at the intersection of adjacent fuel sprays emanating from adjacent fuel injectors. As can be seen in FIG. 4, the inlets 21 are circumferentially displaced from the apertures 15, which inject the primary air directly into the fuel sprays or cones.

The control means 10 may be operatively connected to the throttle control system for the gas turbine engine such that, under full power conditions it allows the maximum amount of air from the compressor 1 to pass through the inlet 21 into the combustion chamber. This allows the ventilation of the excessively fuel-rich zones in the combustion chamber to avoid the production of nitrogen oxides under high-power operating conditions.

In FIG. 2, the control means comprises a flap-valve which is operatively interposed between the orifice 9b and the inlet tube 21. In an alternative embodiment, illustrated in FIG. 3, the control means 10 comprises a three-way valve, again operatively interposed between the orifice 9b and the inlet tube 21. In this embodiment, however, the system utilizes a second inlet tube 22 to allow air to pass into the dilution zone 16b of the combustion chamber. The second inlet tube 22 is also operatively connected to the three-way valve control means 10 such that the valve controls the amount of air passing through the inlets 21 and 22. The three-way valve may divide the flow of tapped air into a first air portion which passes into the inlet 21 and a second air portion which passes into second inlet 22.

The three-way valve control means 10 may also be operatively connected to the gas turbine engine throttle control such that, under full power conditions, the largest portion of the tapped air passes through inlet 21 into the primary zone 16a of the combustion chamber. Under initial engine starting conditions, or under steady-state operating conditions, when the gas temperatures in the primary zone 16a of the combustion chamber is relatively low, most of the tapped air will then be introduced into the dilution zone 16b through second inlet 22.

The foregoing description is provided for illustrative purposes only and should not be construed as in any way limiting this invention, the scope of which is defined solely by the appended claims.

We claim:

1. A system for reducing nitrogen-oxide emissions from a gas turbine engine having an air compressor and a generally annular combustion chamber, the combustion chamber having a primary zone in which injected fuel is burned and a dilution zone, comprising:
 a) a plurality of fuel injectors arranged in a generally circular array so as to inject a plurality of intersecting fuel sprays into the primary zone of the combustion chamber;
 b) tap means to tap a portion of the air from the air compressor;
 c) inlet means to introduce at least a portion of the tapped air into the combustion chamber in the primary zone at the intersection of adjacent fuel sprays; and,
 d) control means operatively associated with the tap means and inlet means to control the airflow passing to the inlet means.

2. The system of claim 1 wherein the gas turbine engine has a throttle control and further comprising means operatively connecting the control means to the throttle control such that the control means allows substantially all of the tapped air to flow to the inlet means under full throttle conditions.

3. The system of claim 1 wherein the gas turbine engine has a casing enclosing the combustion chamber and wherein the control means is located externally of the casing.

4. The system of claim 1 wherein the control means comprises an adjustable flap valve.

5. The system of claim 1 further comprising second inlet means operatively associated with the tap means and the control means to introduce at least a portion of the tapped air into the dilution zone of the combustion chamber.

6. The system of claim 5 wherein the control means comprises a three-way valve which divides the tapped air into a first portion supplied to the inlet means and a second portion supplied to the second inlet means.

7. The system of claim 6 wherein the gas turbine engine has a throttle control and further comprising means operatively connecting the three-way valve to the throttle control means such that, under full throttle, a major portion of the tapped air is supplied to the inlet means.

* * * * *